Figure 1:
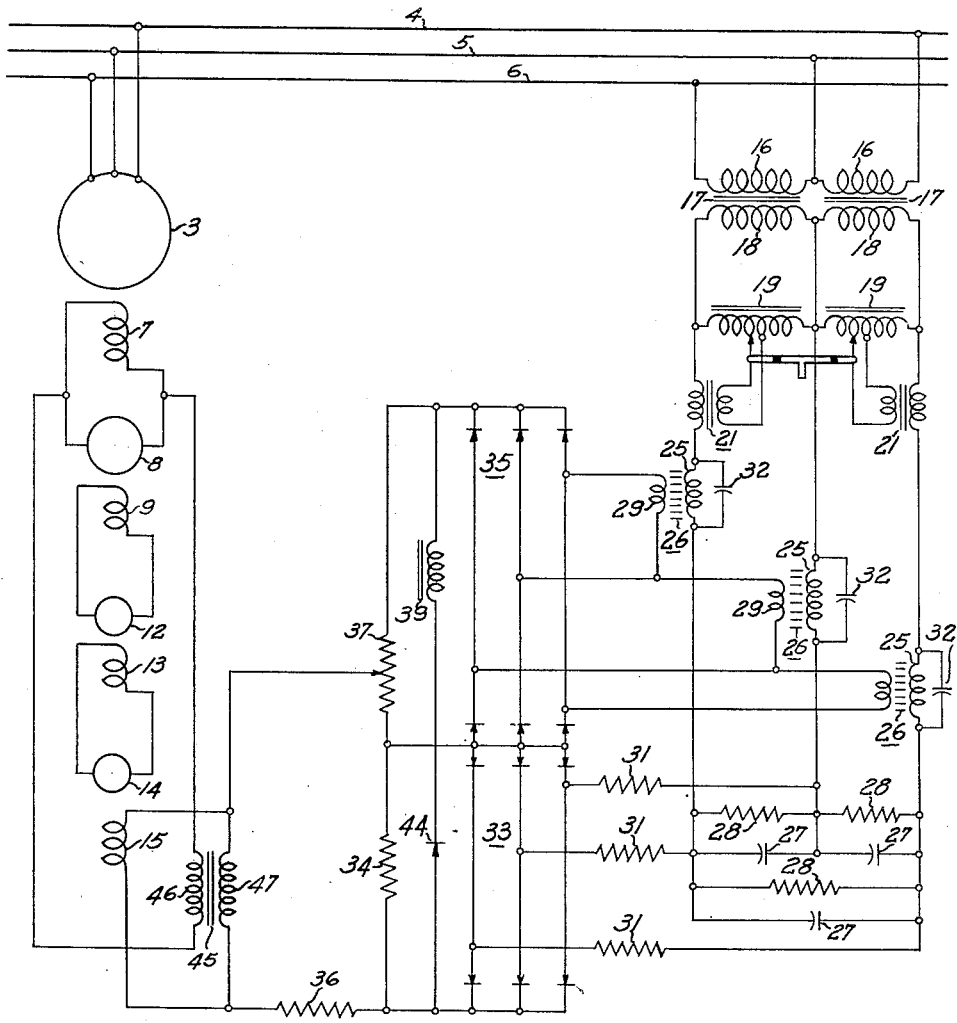

Nov. 27, 1951  D. J. SIKORRA  2,576,646
REGULATING SYSTEM UTILIZING A NONLINEAR RESONANT NETWORK
Filed Sept. 9, 1949

LINE VOLTS

Inventor
Daniel J. Sikorra
by Didier Journeaux
Attorney

Patented Nov. 27, 1951

2,576,646

UNITED STATES PATENT OFFICE 2,576,646

REGULATING SYSTEM UTILIZING A NONLINEAR RESONANT NETWORK

Daniel J. Sikorra, Milwaukee, Wis., assignor to Allis-Chalmers Manufacturing Company, Milwaukee, Wis., a corporation of Delaware Application September 9, 1949, Serial No. 114,751

11 Claims. (Cl. 322—32)

This invention relates in general to systems for regulating an electric quantity, and in particular to the networks utilized in detecting variations of the electric quantity from a normal value.

One of the types of network utilized heretofore for such purposes comprises a nonlinear circuit, the output of which varied abruptly at a predetermined value of the electric quantity. The output of the nonlinear circuit was balanced against another measure of the regulated quantity or some other reference quantity, to produce a differential quantity for controlling the regulating system. Such systems lacked the sensitivity required for many applications and had the further disadvantage of requiring a bulky and power consuming device for providing a measure of the regulated quantity. These disadvantages can be eliminated by utilizing a component of the nonlinear resonant network to supply a reference voltage which is balanced against the output voltage of the nonlinear resonant circuit serving as a measure of the regulated quantity.

In many regulating system a separate minimum excitation control device is provided which, when the excitation of the regulated machine tends to decrease below a certain value, produces a voltage which tends to maintain the excitation of the machine at or above said value. Many other regulating systems utilize a current limiting device which, when the current in the regulated circuit tends to exceed a critical value, produces a signal voltage tending to reduce the excitation of the machine to maintain the load current below the critical value. To obtain the maximum speed of response of such devices, it is desirable to limit the value of the signal voltage supplied by the electric quantity responsive network which must be overcome by the voltage produced by the current limiting device or the minimum excitation control device.

It is therefore an object of the present invention to provide a regulating system utilizing a nonlinear resonant network in which a reference voltage is supplied by an element of the nonlinear network.

It is a further object of this invention to provide an improved regulating system for a dynamoelectric machine which limits the amplitude of the control voltage which may be applied to the dynamoelectric machine.

It is a further object of this invention to provide a regulating system which is especially adapted for the use of minimum excitation control devices or current limiting devices.

Figure 2:
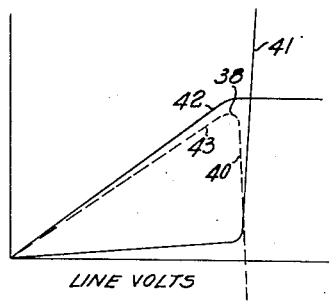

Objects and advantages other than those stated above will be apparent from the following description when read in connection with the accompanying drawing, in which:

Fig. 1 is a diagrammatic representation of a regulating system embodying the apparatus and circuits of the invention; and Fig. 2 is a graph, the curves of which represent the relationship between the voltages of the electric quantity responsive network of the invention.

Referring to Fig. 1, a generator 3 is shown supplying a three phase alternating current load system represented by conductors 4, 5 and 6. Generator 3 is provided with a field winding 7, the energization of which is supplied by a main exciter 8. Main exciter 8 is provided with a field winding 9 which is energized by an exciter generator 12. Field winding 13 of exciter generator 12 is supplied from an exciter generator 14. Field winding 15 of exciter generator 14 is connected to be responsive to the voltage of generator 3 to maintain the voltage of generator 3, which is the regulated quantity, at a substantially constant value, as will be more fully explained hereinafter. It will be understood that the number of exciter generators used will depend upon the amount of power amplification desired of the signal received from the voltage responsive network.

Connected across the conductors 4, 5 and 6, to be energized by the voltage of generator 3, are the primary windings 16 of transformers 17. The secondary windings 18 of transformers 17 are connected to adjustable auto transformers 19, which are in turn connected to booster transformers 21. This combination of auto transformers 19 and booster transformers 21 provides for a smooth adjustment of the voltage supplied from transformers 17 to the voltage responsive network.

Each phase of the system is provided with a nonlinear resonant circuit which is energized by a measure of the regulated voltage of circuit 4, 5 and 6 through transformers 17, 19 and 21. Each nonlinear resonant circuit comprises the winding 25 of a saturable reactor 26 connected in series with a capacitor 27. Capacitors 27 may be connected in star connection but are preferably connected in delta to reduce the capacitance of the capacitors 27 required, since in a delta connection each capacitor 27 carries combined currents of two saturable reactors. Each winding 25 may be shunted by a small capacitor 32 for the purposes of sharpening the point of resonance of the nonlinear circuits.

To obtain the desired reference quantity, each reactor 26 is provided with a secondary winding 29, whereby the reactors operate to a limited extent as saturable transformers. The voltage of each winding 29 is always proportional to the voltage of its associated primary winding 25. This proportional voltage, when rectified, is opposed to the rectified voltage of capacitors 27 to produce a differential voltage for controlling the electric quantity regulated. If an unbalance existed between the voltages of windings 25, the nonlinear circuits in each phase would not become simultaneously resonant, thereby producing an irregular differential voltage for controlling the regulating system. To prevent such unbalances, secondary windings 29 are preferably connected in delta, since any unbalance in the voltage between windings 25 will produce in closed delta connected windings 29 a circulating current which tends to eliminate the unbalance.

Capacitors 27 are connected with a resistor 34 through three voltage reducing resistors 31 and a three phase rectifier 33 of any suitable known type to impress on the resistor 34 a rectified voltage proportional to the average of the voltages of the capacitors. A similar three phase rectifier 35 is connected with the secondary windings 29 of transformers 26 to produce a rectified voltage which is proportional to the average of the voltages of windings 29 and is impressed across a resistor 37. Rectifiers 33, 35 are so connected that the voltage of resistor 37 opposes the voltage of resistor 34. Field winding 15 of exciter 14 is connected across resistor 34 and an adjustable portion of resistor 37 through an adjustable tap on resistor 37. Winding 15 is thereby directionally energized in accordance with a signal voltage equal to the difference between the voltage of resistor 34 and the voltage of the adjacent portion of resistor 37. A resistor 36 in the circuit of winding 15 serves to lower the time constant of this circuit and thereby accelerates the response of exciter 14 to variations in the differential voltage.

To prevent hunting of the system, any suitable known antihunting means may be provided, such as a stabilizing transformer 45 having a primary winding 46 connected across exciter 8 and a secondary winding 47 connected across field winding 15.

The variations in the voltages across capacitors 27 and across secondary windings 29 in function of variations of the voltage of generator 3 are shown by the curves of Fig. 2. Curve 41 of Fig. 2 represents the portion of the rectified voltage of capacitors 27 which is impressed on resistor 34. Curve 42 represents the rectified voltage of transformer secondary windings 29 as it appears across the portion of resistor 37 adjacent resistor 34. Because of the nonlinearity of the circuit comprising transformer primary windings 25 and capacitors 27, at low line voltages the major part of the line voltage is absorbed across primary windings 25. Hence, as the line voltage is increased from zero the voltage across primary windings 25 increases steadily as shown by curve 42 of Fig. 2, while the voltage across capacitors 27 remains at a low value, as shown by the lower portion of curve 41 of Fig. 2. However, at a critical value of the line voltage, as determined by the saturation characteristics of primary windings 25 and saturable cores 26, the nonlinear circuit becomes resonant. At this critical point, the voltage across capacitors 27 suddenly increases, as shown by the steep portion of curve 41. A resistor 28 may be connected across each capacitor 27 to adjust the slope of this portion of curve 41.

Transformer 26 is designed to saturate at a predetermined voltage as shown by the knee of curve 42. Because of the saturation, curves 41 and 42 intersect at substantially right angles, thereby giving the most sharply defined point of intersection of the curves obtainable. Since the voltage of each secondary winding 29 is directly proportional to the voltage of its associated primary winding 25, curve 42 may be considered as proportionally representing the voltage of secondary windings 29 as well as primary windings 25.

Curve 43, obtained by subtracting the ordinates of curve 41 from those of curve 42, represents the differential voltage applied to field winding 15 at varying values of line voltage.

In the operation of the system as shown, the circuit elements are so adjusted that when the voltage of generator 3 has the desired value, the voltage of field winding 15 is represented by a given point 40 on curve 43.

If the line voltage increases above the desired value, the voltages of capacitors 27 are increased much more than are the voltages of primary windings 25 and secondary windings 29. Such action reduces the difference between the voltages of capacitors 27 and the voltages of secondary windings 29, thereby reducing or even reversing the voltage applied to field winding 15 of exciter 14. With reduced excitation voltage, exciter 14 lowers its output voltage applied to field winding 13 of exciter 12. Exciter 12 in turn reduces the voltage applied to field winding 9 of pilot exciter 8, whereby the output voltage of dynamoelectric machine 3 is prevented from increasing materially above the desired value.

If the voltage of machine 3 decreases below the desired value, the voltages across capacitors 27 decrease more than the voltages of primary windings 25 and secondary windings 29. Such action increases the difference between the voltages of capacitors 27 and the voltages of windings 29, thereby increasing the excitation supplied to field winding 15 of exciter 14, and consequently increasing the output of machine 3 to prevent it from dropping materially below the desired value.

If a current limiting device (not shown) is used in conjunction with the regulating system, it is desirable to limit the amplitude of the voltage supplied by the electric quantity responsive network in a direction tending to increase the excitation of machine 3. Such limiting action is provided by this invention as shown by the shape of curve 43 which represents the voltage applied to field winding 15 at varying values of line voltage. The point 38 of curve 43 represents the maximum differential voltage which may be applied to field winding 15 in a direction tending to increase the excitation of machine 3, regardless of the value of the regulated quantity.

If considerable load is suddenly removed from machine 3, the voltage of machine 3 tends to increase rapidly, causing the voltage responsive nonlinear network to momentarily produce a large signal voltage tending to greatly reduce the excitation of machine 3. In the case of synchronous machines, a reduction of the machine excitation below a certain value may cause the machine to fall out of synchronism. If a minimum excitation control device (not shown) is utilized in conjunction with the regulating system, it is desirabe to limit the voltage supplied from the voltage responsive network in the direction tending to reduce the excitation of the dynamoelectric machine.

To provide such limiting action, a rectifier 44 and a filtering reactor 39 are connected in series across the outer terminals of rectifiers 33 and 35. Rectifier 44 is so poled as to block the flow of current when the voltage of resistor 37 exceeds the voltage of resistor 34. When the voltage of resistor 34 exceeds the voltage of resistor 37, rectifier 44 substantially short circuits resistors 34, 37, thereby substantially equalizing the voltages of the resistors. This has the effect of limiting the differential voltage applied to field winding 15 in a direction to reduce the excitation of machine 3. It will be apparent that if field winding 15 were connected across the noncommon terminals of resistors 34 and 37, rectifier 44 would institute its limiting action when zero voltage exists on control field winding 15. However, as a result of the connection of field winding 15, as shown, to a terminal of resistor 34 and to the adjustable tap on resistor 37, when the limiting action of rectifier 44 takes place, the voltage impressed on field winding 15 has reversed and reached a predetermined value to permit limited reverse forcing of field winding 15.

From the foregoing, it will be obvious that I have produced a regulator which is fast acting and which produces a large control voltage in response to a relatively small change in the regulated quantity.

Although but one embodiment of the invention has been shown and described, it will be apparent to those skilled in the art that various modifications may be made therein without departing from the spirit of the invention or from the scope of the appended claims. In particular, the invention has been illustrated in connection with the regulation of the voltage of a dynamoelectric machine, but the invention may also be utilized to regulate the current of an electric system by energizing the quantity responsive network by a voltage which is a measure of the current to be regulated.

It will also be apparent that if desired, main exciter 2 could be provided with a self-excited field winding to thereby produce the majority of its own excitation. Under such conditions, the system would be operated so that at normal voltage of machine 3 the operating point of winding 15 falls at the intersection of curves 41 and 42 to render control field winding 15 deenergized at normal voltage of machine 3.

It is claimed and desired to secure by Letters Patent:

1. In a regulating system for maintaining an electric quantity substantially constant, the combination of a network comprising a transformer and a capacitor disposed to be energized by said electric quantity, said transformer having a saturable core, a primary winding, and a secondary winding, said primary winding being connected in series with said capacitor for nonlinear resonance to cause the voltage of said capacitor to vary abruptly at a critical value of said electric quantity, a rectifier connected across said capacitor, a rectifier connected across said secondary winding, and control means differentially responsive to the voltages of said rectifiers for controlling said electric quantity.

2. In a regulating system for maintaining an electric quantity substantially constant, the combination of a nonlinear resonant circuit disposed to be energized by a measure of said electric quantity, said nonlinear circuit comprising a capacitor and a reactor having a saturable core and a winding connected in series with said capacitor to cause the voltage of said capacitor to vary abruptly at a critical value of said electric quantity, means for producing a control voltage equal to the difference between a voltage proportional to the voltage of said reactor and the voltage of said capacitor, means responsive to said control voltage for controlling said electric quantity, and means including rectifier means operable in response to said control voltage assuming a predetermined polarity and reaching a predetermined magnitude for preventing further increase in the magnitude of said control voltage.

3. In a regulating system for a dynamoelectric machine having an exciter, the combination of a nonlinear resonant circuit disposed to be energized by a measure of the output of said dynamoelectric machine, said nonlinear circuit comprising a capacitor and a reactor having a saturable core and a winding connected in series with said capacitor for producing a voltage which varies abruptly at a critical value of said output, means for producing a control voltage equal to the difference between voltages proportional to the voltage of said reactor and the voltage of said capacitor, field winding means responsive to said control voltage for controlling said dynamoelectric machine, means including rectifier means operable in response to said control voltage assuming a predetermined polarity and reaching a predetermined magnitude for preventing further increase in the magnitude of said control voltage, and a stabilizing transformer having a primary winding and a secondary winding, said primary winding being connected across said exciter, and said secondary winding connected in circuit with said field winding means.

4. In a regulating system for maintaining an electric quantity of a three phase system substantially constant, the combination of a plurality of saturable transformers and capacitors disposed to be energized by a measure of said electric quantity, each said transformer having a primary winding and a secondary winding, said capacitors being connected in delta and said secondary windings being connected in delta, a nonlinear resonant circuit in each said phase comprising one of said primary windings connected in series with one of said capacitors to produce a voltage which varies abruptly at a critical value of said electric quantity, and control means differentially responsive to the average of the voltages of said secondary windings and the average of the voltages of said capacitors for controlling said electric quantity.

5. In a regulating system for maintaining an electric quantity of a three phase system substantially constant, the combination of a plurality of saturable transformers and capacitors disposed to be energized by a measure of said electric quantity, each said transformer having a primary winding and a secondary winding, said secondary windings being connected in delta, a nonlinear resonant circuit in each said phase comprising one of said primary windings connected in series with one of said capacitors to produce a voltage which varies abruptly at a critical value of said electric quantity, and control means differentially responsive to the average of the voltages of said secondary windings and the average of the voltages of said capacitors for controlling said electric quantity.

6. In a regulating system for maintaining an electric quantity substantialy constant, the combination of a nonlinear resonant circuit disposed to be energized by a measure of said electric quantity, said nonlinear resonant circuit comprising a saturable reactor connected in series with a capacitor to cause the voltage of said capacitor to vary abruptly at a critical value of said electric quantity, control means for varying the value of said electric quantity, connections between said reactor and said control mueans to impress on said control means a first control voltage component proportional to the voltage of said reactor, and connections between said capacitor and said control means to impress on said control means a second control voltage component proportional to the voltage of said capacitor, said connections opposing the effects of said control voltage components to cause said control means to maintain said quantity substantially constant.

7. In a regulating system for maintaining an electric quantity substantially constant, the combination of a nonlinear resonant circuit disposed to be energized by a measure of said electric quantity, said nonlinear resonant circuit comprising a saturable reactor connected in series with a capacitor to produce across said capacitor a voltage which varies abruptly at a critical value of said electric quantity, rectifier means connected to said reactor and to said capacitor, said rectifier means being provided with output terminals having an output voltage equal to the difference between voltages proportional to the voltage of said reactor and the voltage of said capacitor, and control means connected to said output terminals responsive to said output voltage for controlling said electric quantity.

8. In a regulating system for a dynamoelectric machine, the combination of a nonlinear resonant circuit disposed to be energized by a measure of the output of said dynamoelectric machine, said nonlinear resonant circuit comprising a saturable reactor connected in series with a capacitor to produce across said capacitor a voltage which varies abruptly at a critical value of said output, rectifier means connected to said reactor and to said capacitor, said rectifier means being provided with output terminals having an output voltage equal to the difference between voltages proportional to the voltage of said reactor and the voltage of said capacitor, and field winding means connected to said output terminals responsive to said output voltage for controlling said dynamoelectric machine to maintain said output substantially constant.

9. In a regulating system for maintaining an electric quantity substantially constant, the combination of a nonlinear resonant circuit disposed to be energized by a measure of said electric quantity, said nonlinear circuit comprising a saturable reactor connected in series with a capacitor to produce across said capacitor a voltage which varies abruptly at a critical value of said electric quantity, a first rectifier connected to said reactor to produce a first rectified voltage proportional to the voltage of said reactor, a second rectifier connected to said capacitor to produce a second rectified voltage proportional to the voltage of said capacitor, said first and said second rectifiers having a common terminal to produce across the noncommon terminals of said rectifiers a control voltage equal to the difference between said rectified voltages, control means connected to said noncommon terminals responsive to said control voltage for controlling said electric quantity, and a third rectifier connected across said first and second rectifiers operable upon said control voltage assuming a predetermined polarity and reaching a predetermined magnitude for preventing further increase in the magnitude of said control voltage.

10. In a regulating system for maintaining an electric quantity substantially constant, the combination of a nonlinear resonant circuit disposed to be energized by a measure of said electric quantity, said nonlinear circuit comprising a saturable reactor connected in series with a capacitor to produce across said capacitor a voltage which varies abruptly at a critical value of said electric quantity, a first rectifier connected to said reactor to produce a first rectified voltage proportional to the voltage of said reactor, a second rectifier connected to said capacitor to produce a second rectified voltage proportional to the voltage of said capacitor, said first and said second rectifiers having a common terminal to produce across the noncommon terminals of said rectifiers a control voltage equal to the difference between said rectified voltages, control means connected to said noncommon terminals responsive to said control voltage for controlling said electric quantity, and limiting means comprising a third rectifier connected in series circuit with a reactor across said first and second rectifiers, said limiting means being operable in response to said control voltage assuming a predetermined polarity and reaching a predetermined magnitude for preventing further increase in the magnitude of said control voltage.

11. In a regulating system for maintaining an electric quantity substantially constant, the combination of a nonlinear resonant circuit disposed to be energized by a measure of said electric quantity, rectifier means connected to said resonant circuit, control means connected to said rectifier means to be energized by a control voltage dependent upon said electric quantity to maintain said electric quantity substantially constant, and means including a rectifier connected across said rectifier means operable upon said control voltage assuming a predetermined polarity and reaching a predetermined magnitude for preventing further increase in the magnitude of said control voltage.

DANIEL J. SIKORRA.

REFERENCES CITED

The following references are of record in the file of this patent:

UNITED STATES PATENTS

| Number | Name | Date |
|---|---|---|
| 2,194,299 | Edwards et al. | Mar. 19, 1940 |
| 2,366,577 | Thompson | Jan. 2, 1945 |
| 2,374,199 | Harris | Apr. 24, 1945 |
| 2,414,569 | Tubbs | Jan. 21, 1947 |
| 2,467,753 | Kirshbaum | Apr. 19, 1949 |
| 2,477,991 | Lamm | Aug. 2, 1949 |
| 2,482,482 | Harder et al. | Sept. 20, 1949 |